J. B. BROLASKI,

Assignor to C. T. SHEPARD.

Folding Crib and Cradle Combined.

No. 9,596. Reissued March 8, 1881.

Witnesses,
Charles Sercick
Fred. Gallochly

Inventor,
Joseph B. Brolaski
by
Alg. Selkirk.
Attorney

N. PETERS, PHOTO-LITHOGRAPHER, WASHINGTON, D. C.

UNITED STATES PATENT OFFICE.

JOSEPH B. BROLASKI, OF ST. LOUIS, MISSOURI, ASSIGNOR TO CHARLES T. SHEPARD, OF ALBANY, NEW YORK.

FOLDING CRIB AND CRADLE COMBINED.

SPECIFICATION forming part of Reissued Letters Patent No. 9,596, dated March 8, 1881.

Original No. 131,049, dated September 3, 1872. Application for reissue filed November 8, 1880.

*To all whom it may concern:*

Be it known that I, JOSEPH B. BROLASKI, of the city and county of St. Louis, in the State of Missouri, have invented new and useful Improvements in Folding Cribs and Cradles, of which the following is a specification.

My invention relates to an improved combined crib and cradle, which shall be so constructed as to adapt it for use as a crib or cradle, and which, when not in use, may be folded into small compass, so that it may be rolled under the bed.

The objects of my invention are to furnish a crib or cradle with folding side and end guards which will fold horizontally over the bedding within the crib and hold the same within, and have one of its side guards adapted to be folded to a vertically-hanging position at a side of the crib; and also to furnish the crib with legs which will fold upward from vertically-standing positions to horizontal positions and beneath the bed-case, so as to reduce the height of the crib and permit it to readily pass beneath a low standing bedstead, and be provided with means by which the crib, when its parts are folded together, will be readily trundled from place to place, and the crib, when standing beside a bedstead, will be secured to the same. I attain these objects by the mechanism illustrated in the accompanying drawings, in which—

Figure 1:
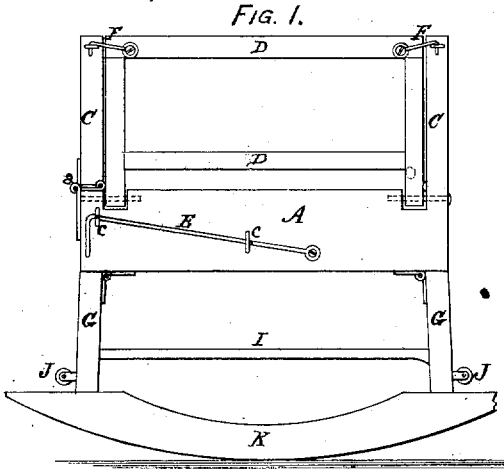
Figure 2:
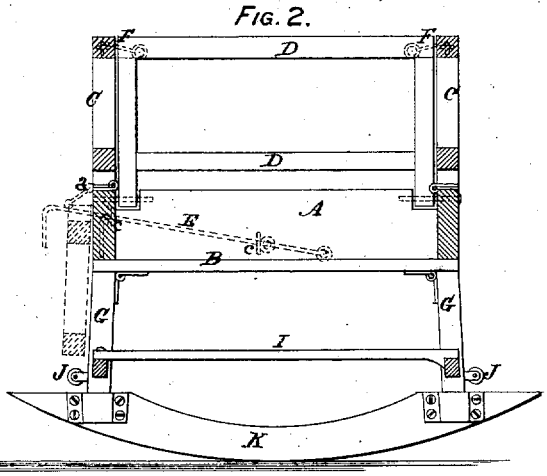
Figure 3:
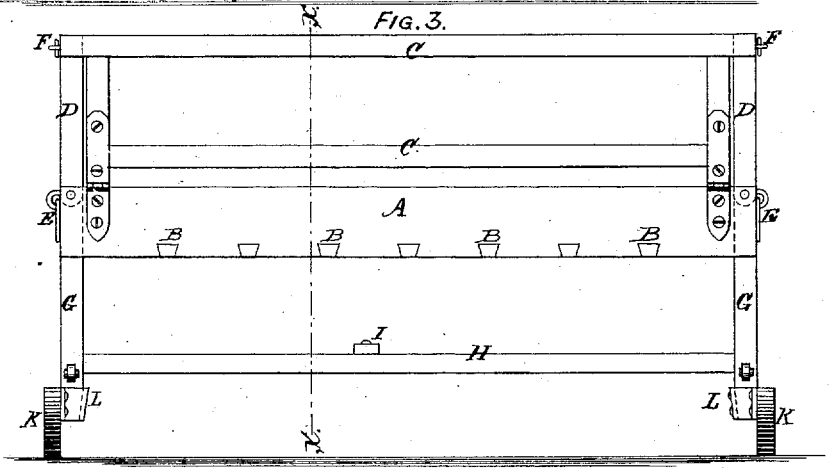
Figure 4:
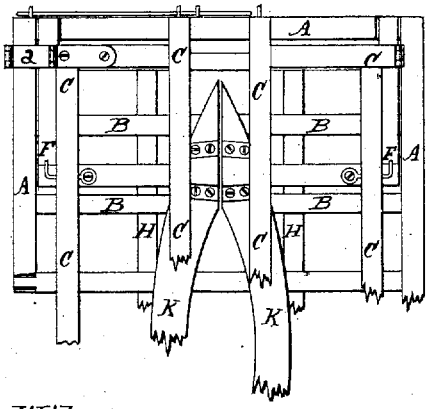
Figure 5:
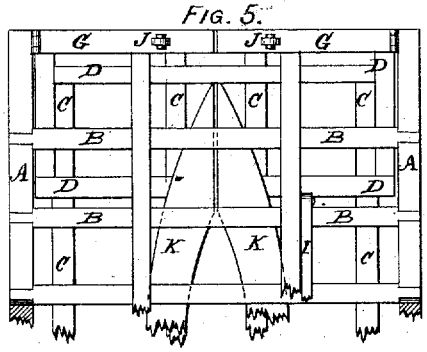

Figure 1 is an end view of my improved folding-crib adjusted as a cradle. Fig. 2 is a detail vertical cross-section of the same, taken through the line *x x*, Fig. 3. Fig. 3 is a side view of the same. Fig. 4 is a top view of a part of the same folded. Fig. 5 is a bottom view of a part of the same folded.

Similar letters refer to similar parts throughout the several views.

In the drawings, A is the main frame or bed-case, with which the other parts of the crib are connected.

B B are the slats composing the bed-bottom, which slats are secured within the said case and in the lower portion thereof, and are, with the case, adapted to permanently hold the bedding.

To the upper edges of the side and end bars or pieces of the bed-case are hinged the side guards, C C, and end guards, D D, the latter being hinged to the end pieces of said bed-case, on a line below the line of hinging of the former with the side pieces of said case, so that the said end guards will be first folded over the open area of the case and the bedding within, and the said side guards will be folded down over the end guards and lock them from being raised by the elastic force of the bedding within. One of the side guards, C, is connected with the upper edge of frame A by double-jointed hinges or connections *a*, Fig. 2, so that it may be turned down into a horizontal position within the case A, or over the bedding within, or turned up into a vertical or standing position, as shown by full lines in Fig. 2, or be turned down into a vertical and hanging position at a side of the said case, as shown by dotted lines in the same figure. This construction enables the said double-jointed hinged side guard to be turned down to the side of the bed-case and out of the way, so as to give the occupant of the bed at the side of the crib convenient access to a child lying in the latter.

Hooks E, Figs. 1, 2, and 3, are provided to secure the crib to a bed side, which hooks are secured to the end bars or pieces of the bed-case by keepers *c*, so that they may be drawn out for use, as shown by dotted lines in Fig. 2, and be pushed back out of the way, as shown in Fig. 1, when not required for use.

The upper portions of the side and end pieces or guards, C and D, when turned up to a vertical or standing position, are held together by hooks F, pivoted to the end guards, and hooking into eyes or staples attached to the side guards, as shown in Figs. 1, 2, and 3.

The legs G G are hinged at their upper ends to the lower edges of the frame or bed-case A, at or near its corners, so that they can be turned from a vertically-standing position, as shown in Figs. 1 and 2, to a horizontal position against the lower side of the bed-case, as shown in Fig. 5. These folding legs are stiffened or braced in pairs by means of a bar, H, rigidly connected with each one of a pair of legs, as shown in Fig. 3, which bar serves as a means for holding the legs from swaying in either direction. A cross-bar, I, Figs. 1, 2, and 3, having one of its ends pivoted to one of the bars of one pair of legs, and the other end engaging with the opposite bar H of the other pair of legs, holds the said legs of each pair from folding inward from a vertical position.

Secured to the outer sides of each of the legs G, and opposite from the folding sides of the same, at a point between the hinged and foot ends, are the caster-wheels J J, which caster-wheels, when the legs are folded horizontally beneath the bed-case A, will hold the foot ends of the same up against the lower sides of the bed-case, and prevent them from digging into the floor or carpet, while at the same time they serve as a means for trundling the crib from place to place.

K K are detachable rockers provided with sockets or keeps L for receiving the foot-ends of the crib when it is desired to use the crib as a cradle, and when the several parts of the crib are folded together the said rockers may be laid upon the bedding within the bed-case A, and be held thereon by the side and end guards, C and D, being folded down upon them as shown in Fig. 4.

It will be readily observed that by the above-described improvement the crib may readily have its several folding parts opened out, so as to comfortably and securely hold an occupant and support the said crib at a desirable distance above the floor or on a plane with the upper side of a bedstead, against which the crib may be placed, and when selected one of the side guards may be readily folded from a vertical-standing position to a vertically-hanging position, and against a side of the bed-case, with its open side facing a bedstead, and when placed beside a bedstead the crib may be readily secured from being moved from the same, so that the crib will, in fact, be a detachable annex to such bedstead.

It will also be readily observed that the side and end guards, when folded down horizontally over any bedding within the bed-case, in the order above described, will effectually hold the bedding from escaping therefrom when the crib is placed on an end or side against a wall of a room or an end of a bedstead; and that when the side and end guards and the legs are folded against the bed-case the crib will be reduced to a compact form, so as to be adapted to be passed beneath an ordinarily-low bedstead, and that the caster-wheels attached to the outer sides of the legs will form a convenient means for trundling the crib to and from beneath the bedstead, or from place to place, as may be selected.

It will, also, be readily observed that the crib will be readily made to have all the essential elements of a cradle, by means of the rockers and their sockets, adapted to be connected with the legs of the crib.

Having described my invention, what I claim, and desire to secure by Letters Patent, is—

1. In a folding crib or cradle, the combination, with the main frame or bed-case A, having a bed-bottom, and adapted to permanently hold bedding, of the end boards or guards, D D, hinged to the end pieces of said frame or case, and turning over the open area of the same, with their bodies below a line on a plane with the upper edges of the sides of said case, substantially as and for the purpose set forth.

2. In a folding crib or cradle, the combination, with the main frame or bed-case A, having a bed-bottom, and adapted to permanently hold bedding, of folding side guards or pieces, C C, and folding end guards or pieces, D D, the latter hinged to the ends of said case on a line below the plane of the line of the hinging of the former with the sides of the same, so that the said end guards will be folded within the upper open area of the case, or upon the bedding thereon, and the said side guards will fold over said end guards, and lock the same from being raised by the elastic force of the bedding beneath, substantially as and for the purpose set forth.

3. In a folding crib or cradle, the combination, with the main frame or bed-case A, having a bed-bottom supported with the same and adapted to permanently hold bedding, of the folding legs G G, hinged from the lower side of said case, so that the said case and its contents will be elevated above the floor when said legs are turned down to a vertical position, and be lowered to near the floor when folded up against said case, substantially as and for the purpose set forth.

4. In a folding crib or cradle, the combination, with the main frame or bed-case A, and legs G G, hinged from the lower side of said case and adapted to be folded upward, of the caster-wheels J J, secured to the outer sides of said legs at points between their points of hinging with said case and their foot ends, so that when said legs are folded up to said case the said case will be supported by said caster-wheels and be adapted to be trundled from place to place, substantially as set forth.

5. The main frame A, combined with hinged side and rear guards, C D, and hinged legs G, the said guards folding upon, and the said legs folding under, said frame, as and for the purpose described.

6. In a folding crib or cradle, the combination, with the bed-case A, of a folding side guard, C, and double-jointed hinges *a*, whereby the said folding side guard will be adapted to be turned in one direction from a vertically-standing position to a horizontal position over bedding contained within said bed-case, and in an opposite direction to a vertical suspended position at a side of the same, substantially as and for the purposes described.

7. In combination with a crib provided with legs for elevating the bed-case of the same, and side and end pieces or guards, in which one of said side guards is adapted to be folded from an erect position above the upper edges of the bed-case of the crib to a vertically-suspended position at a side of the same, of device E, adapted to be engaged with a bedstead contiguous to the crib, whereby the latter will be made to serve as a detachable annex to the former, substantially as and for the purpose set forth.

8. The combination, with legs G G of a crib, of rockers K K, provided with sockets L L, and adapted to be attached to and detached from said legs, substantially as and for the purpose set forth.

JOSEPH B. BROLASKI.

Witnesses:
HENRY HIEMENZ, Jr.,
GUSTAVUS ERNST.